United States Patent
Gaither

(10) Patent No.: US 11,420,617 B2
(45) Date of Patent: Aug. 23, 2022

(54) OFF-HIGHWAY AUTO EV MODE

(71) Applicant: Toyota Motor Engineering & Manufacturing North America, Inc., Plano, TX (US)

(72) Inventor: Geoffrey David Gaither, Brighton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/859,446

(22) Filed: Apr. 27, 2020

(65) Prior Publication Data

US 2021/0331662 A1    Oct. 28, 2021

(51) Int. Cl.
*B60W 20/40* (2016.01)
*G01S 19/42* (2010.01)
*B60W 40/02* (2006.01)

(52) U.S. Cl.
CPC .......... *B60W 20/40* (2013.01); *B60W 40/02* (2013.01); *G01S 19/42* (2013.01); *B60W 2420/40* (2013.01); *B60W 2554/80* (2020.02); *B60W 2555/20* (2020.02); *B60W 2556/50* (2020.02)

(58) Field of Classification Search
CPC .. B60W 20/40; B60W 40/02; B60W 2555/20; B60W 2554/80; B60W 2420/40; G01S 19/42
See application file for complete search history.

(56) References Cited

U.S. PATENT DOCUMENTS

| | | | |
|---|---|---|---|
| 8,285,433 B2 | 10/2012 | Ang | |
| 8,437,896 B2 | 5/2013 | Kaita et al. | |
| 8,948,943 B2 | 2/2015 | Takagi | |
| 8,958,936 B2 | 2/2015 | Treharne et al. | |
| 9,020,671 B2 | 4/2015 | Lindemann et al. | |
| 9,487,125 B2 | 11/2016 | Geller | |
| 9,566,978 B2 | 2/2017 | Yang et al. | |
| 9,697,733 B1* | 7/2017 | Penilla | B60L 58/12 |
| 10,064,018 B1* | 8/2018 | DeLuca | G06Q 30/0261 |
| 10,281,286 B2 | 5/2019 | Ogawa | |
| 10,343,679 B2 | 7/2019 | Okada | |
| 10,513,253 B2 | 12/2019 | Kuwahara et al. | |
| 2010/0138089 A1 | 6/2010 | James | |
| 2012/0001841 A1* | 1/2012 | Gokingco | H05B 47/11 345/102 |

(Continued)

FOREIGN PATENT DOCUMENTS

| | | |
|---|---|---|
| CN | 108422993 A | 8/2018 |
| JP | 2011248647 A | 12/2011 |

*Primary Examiner* — Dale W Hilgendorf
*Assistant Examiner* — Hana Lee
(74) *Attorney, Agent, or Firm* — Snell & Wilmer LLP

(57) ABSTRACT

Methods, systems, devices and apparatuses for an off-road vehicle control system. The control system for the vehicle includes at least one of a navigation unit or a sensor. The navigation unit is configured to obtain a current location of the vehicle. The sensor is configured to obtain sensor data of a surrounding environment of the vehicle. The control system includes an electronic control unit. The electronic control unit is coupled to the at least one of the navigation unit or the sensor. The electronic control unit is configured to set the vehicle into an electrical vehicle (EV) mode based on the current location of the vehicle or the sensor data.

19 Claims, 6 Drawing Sheets

(56) References Cited

U.S. PATENT DOCUMENTS

| | | | |
|---|---|---|---|
| 2015/0197235 A1* | 7/2015 | Yu | F02D 29/02 |
| | | | 701/22 |
| 2015/0217755 A1 | 8/2015 | Bryan et al. | |
| 2015/0274156 A1* | 10/2015 | Phillips | B60W 20/40 |
| | | | 701/22 |
| 2019/0126910 A1* | 5/2019 | Kim | F02N 11/00 |
| 2019/0135268 A1* | 5/2019 | Lee | B60K 6/442 |
| 2020/0182178 A1* | 6/2020 | Tolley | F01N 3/206 |

* cited by examiner

OFF-HIGHWAY AUTO EV MODE

BACKGROUND

Field

This disclosure relates to a system, method, apparatus and/or device for automatically switching the vehicle into an electrical vehicle (EV) mode.

Description of the Related Art

Various powertrains have been developed for a variety of applications, such as passenger vehicles and class 8 trucks. Typically, current powertrains in a passenger vehicle allow a user to select a button or provide another form of user input to switch the powertrain into a different mode, such as an electrical vehicle (EV) mode or a Zero Emission Vehicle (ZEV) mode. These powertrains, however, do not assist the user in identifying when it is most fuel efficient to switch the powertrain into these different modes. Moreover, these powertrains do not learn from past trips or use other environmental variables to determine when it is best to operate in the different modes.

Additionally, these powertrains have not been developed for other industries including agriculture, mining, forestry and other off-highway applications. There are little, if any, electrical vehicle (EV) or Zero Emission Vehicles (ZEV) in the off-highway vehicle industry. Thus, the powertrains of passenger vehicles need to be adapted for off-highway vehicles that operate in different environments and need to account for the various environmental variables associated with these off-highway applications. Many vehicle manufacturers have not considered the various scenarios, environments and use cases that require zero emission operation within the off-highway vehicle industry. For example, in off-highway applications, the vehicle may need to consider factors unique to off-highway applications, such as emissions, safety hazards, objects or other situations unique to the off-highway vehicle industry when operating the off-highway vehicle.

Accordingly, there is a need for a system, apparatus and/or method to adapt the operation of different powertrains to off-highway vehicles.

SUMMARY

In general, one aspect of the subject matter described in this disclosure may be embodied in an off-road vehicle control system ("control system"). The control system for the vehicle includes at least one of a navigation unit or a sensor. The navigation unit is configured to obtain a current location of the vehicle. The sensor is configured to obtain sensor data of a surrounding environment of the vehicle. The control system includes an electronic control unit. The electronic control unit is coupled to the at least one of the navigation unit or the sensor. The electronic control unit is configured to set the vehicle into an electrical vehicle (EV) mode based on the current location or the sensor data.

These and other embodiments may optionally include one or more of the following features. The at least one of the navigation unit or the sensor may include the navigation unit. The electronic control unit may be configured to obtain the current location of the vehicle using the navigation unit. The electronic control unit may compare the current location of the vehicle to a location of a geo-fenced area or a location of an entrance of a structure. The electronic control unit may be configured to determine that the current location of the vehicle is within the geo-fenced area or inside the location of the entrance of the structure. The electronic control unit may be configured to set the vehicle into the EV mode based on the current location being within the geo-fenced area or inside the entrance of the structure.

The at least one of the navigation unit or the sensor may include the sensor. The sensor may be a photodetector and the sensor data may include an amount of ambient light of the surrounding environment. The electronic control unit may be configured to set the vehicle into the EV mode when the amount of ambient light is less than a threshold value or decreases a threshold amount from a baseline.

The sensor may be an anemometer or other airflow sensor. The sensor data may include an amount of airflow of the surrounding environment. The electronic control unit may be configured to set the vehicle into the EV mode when the amount of airflow is less than a threshold value or decreases a threshold amount from a baseline.

The sensor may be an emission sensor. The sensor may include a concentration of an emission and an identification of the emission in the surrounding environment. The electronic control unit may be configured to set the vehicle into the EV mode when the concentration of the emission is greater than a threshold amount.

The sensor may be a proximity sensor or an attachment sensor. The sensor data may include an indication that there is a living being surrounding the vehicle or that a trailer or cargo has been attached to the vehicle. The electronic control unit may be configured to set the vehicle into the EV mode based on the indication.

The control system may include a memory. The memory may be configured to store multiple locations where the EV mode was previously activated. The electronic control unit may be configured to obtain user input. The user input may indicate that a user has activated the EV mode. The electronic control unit may be configured to identify a location of where the user input indicates that the user activated the EV mode. The electronic control unit may be configured to store the location among the multiple locations where the EV mode was previously activated. The electronic control unit may be configured to set the vehicle into the EV mode based on the current location and the multiple locations where the EV mode was previously activated.

In another aspect, the subject matter may be embodied in an off-road vehicle system. The off-road vehicle system includes a sensor configured to detect a parameter of a surrounding environment of the vehicle. The off-road vehicle system includes an electronic control unit coupled to the sensor. The electronic control unit is configured to set the vehicle into an electrical vehicle (EV) mode based on the parameter. The electronic control unit is configured to operate the vehicle in the EV mode.

In another aspect, the subject matter may be embodied in a method for controlling operation of a vehicle. The method includes obtaining, by an electronic control unit and using a navigation unit, a current location of the vehicle. The method includes obtaining, by the electronic control unit and using a sensor, sensor data of a surrounding environment of the vehicle. The method includes setting, by the electronic control unit, the vehicle into an electrical vehicle (EV) mode based on the current location and the sensor data. The method includes operating, by the electronic control unit, the vehicle in the EV mode.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, apparatuses, and methods for a control system for an off-highway vehicle. The control system automatically switches the off-highway vehicle (hereinafter, "vehicle") into an electrical vehicle (EV) mode or other zero-emission vehicle (ZEV) mode (hereinafter, referred to as EV mode) in various situations so that the vehicle operates using electrical power or other zero emission power source. By automatically switching the off-highway vehicle into the EV mode, the control system reduces or eliminates vehicle emissions and/or increase fuel efficiency.

Other benefits and advantages include the capability to learn, predict or otherwise determine when to switch or set the vehicle into the EV mode when the vehicle is not operating on a roadway. The control system identifies various environments where emitting vehicle emissions would present a hazard to the driver, the occupant or another living being. When the vehicle is within one of these various environments where vehicle emissions may be dangerous or hazardous, the control system may switch or set the vehicle into the EV mode to reduce or eliminate emissions that may endanger the driver, occupant or other living being. For example, when the vehicle is within an enclosed structure and there is no air circulation, vehicle emissions may cause carbon monoxide poisoning or other dangers to the driver or occupant of the vehicle, and as such, the control system may set the vehicle to the EV mode.

Additionally, the control system may learn when a driver previously activated or operated the vehicle in the EV mode, and on a later route, automatically switch or set the vehicle into the EV mode when control system determines that the driver is traversing the same area or path where the driver previously activated or operated the vehicle in the EV mode. This allows the control system to adapt operation of the vehicle so that the driver has a better driving experience.

Figure 1:
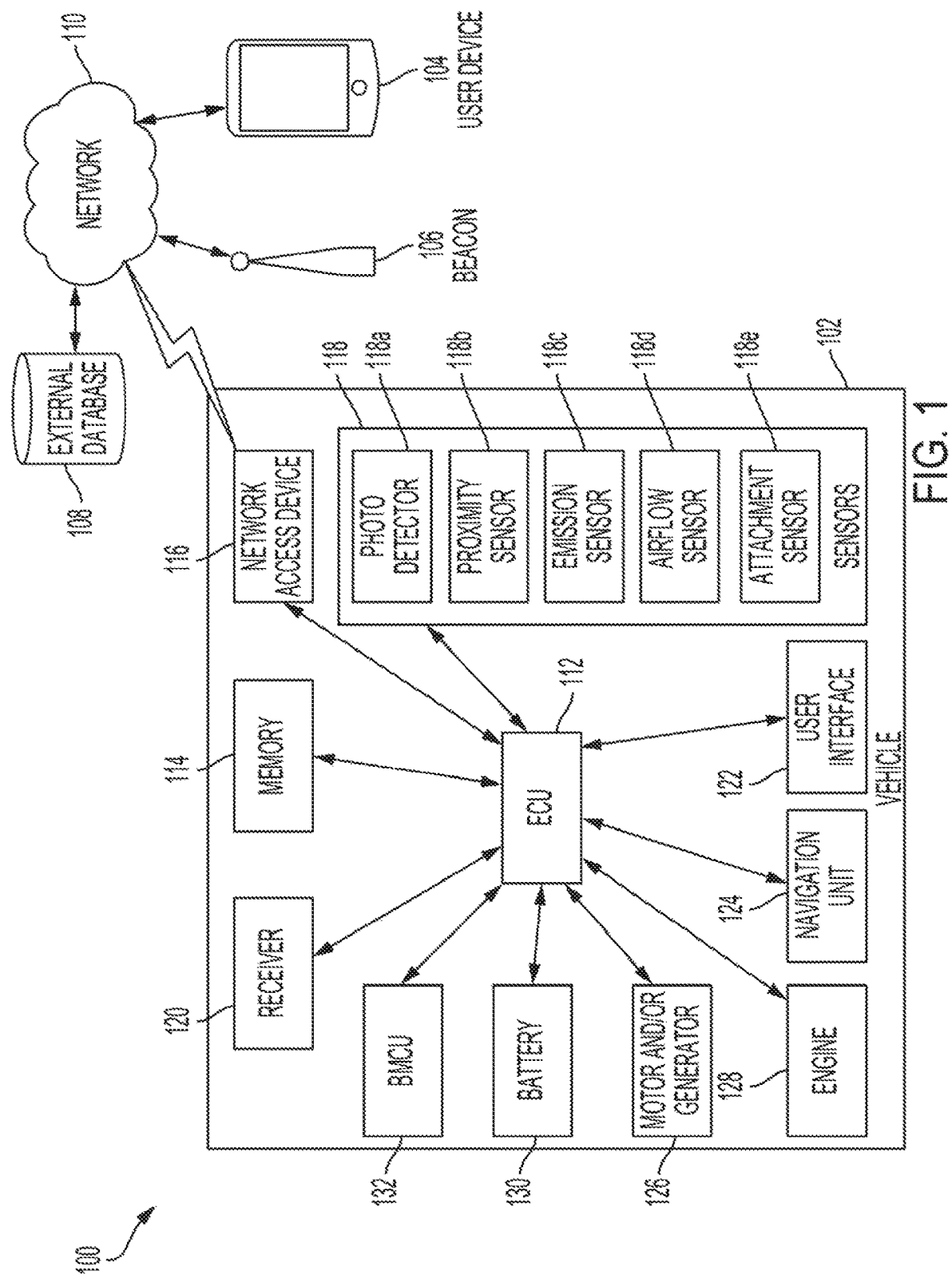
FIG. 1 is a block diagram of an example off-road or off-highway vehicle control system according to an aspect of the invention.

FIG. 1 is a block diagram of an off-road or off-highway vehicle control system ("control system") 100. The control system 100 or a portion of the control system 100 may be retro-fitted, coupled to, integrated with, include or be included within a vehicle 102 or may be entirely separate from the vehicle 102. The control system 100 may include or be coupled to a user device 104, a beacon 106 and/or an external database 108. The user device 104 may be a personal device, a mobile device, such as a smartphone, a tablet other electronic device that may be display notifications, run applications or otherwise interact with the vehicle 102 and/or the control system 100 via a wireless or a wired connection. The user device 104 may belong to the driver or owner of the vehicle 102 and/or a third-party.

The control system 100 may have or use a network 110 to communicate among different components, such as between the vehicle 102, the user device 104, the beacon 106 and/or the external database 108. The network 110 may be a Dedicated Short-Range Communication (DSRC) network, a local area network (LAN), a wide area network (WAN), a cellular network, the Internet, or combination thereof, that connects, couples and/or otherwise communicates among the different components of the control system 100.

The control system 100 may include or be coupled to the external database 108. A database is any collection of pieces of information that is organized for search and retrieval, such as by a computer, and the database may be organized in tables, schemas, queries, reports, or any other data structures. A database may use any number of database management systems. The external database 108 may include a third-party server or website that stores or provides information. The information may include real-time information, periodically updated information, or user-inputted information. A server may be a computer in a network that is used to provide services, such as accessing files or sharing peripherals, to other computers in the network.

The external database 108 may be a map database. The map database may include map information that includes the locations of various structures or objects, such as trees, mines, buildings or other objects, which may interfere with the route of the vehicle 102 or act as an enclosed area, which may result in vehicle emissions presenting a hazard to the driver, occupant or other living being. The map information may also include the locations of various terrain features, such as hills, slopes or other terrain features, along with other aspects surrounding the current location of the vehicle 102, such as property lines, trees, physical fences, buildings, mines, or other structures, that are surrounding the vehicle 102. The map information may be provided to the user device 104 or the user interface 122 so that a user can visualize the surrounding environment and provide user input that indicates a geo-fenced area on a map of the area surrounding the current location of the vehicle 102. The map information may also include the locations of one or more beacons 106 that indicate when the EV mode of the vehicle 102 should be activated, such as at an entrance to a structure or within a geo-fenced area.

The one or more beacons 106 may be a physical device that is physically placed at an entrance of a structure to activate the EV mode within the vehicle 102 when the vehicle 102 passes by the one or more beacons 106 or is within a threshold distance of the one or more beacons 106. The one or more beacons 106 may be placed around, surround, and/or enclose an area to create a geo-fence to activate the EV mode in the vehicle 102 when the vehicle 102 is within the enclosed area. In some implementations, the one or more beacons 106 may be a logical beacon that indicates a coordinate or location of when to activate EV mode in the vehicle 102 when the current location of the vehicle 102 is within a threshold distance of the coordinate or location or is within the enclosed area surrounded by and/or represented by the one or more beacons 106.

The control system 100 determines whether the vehicle 102 is traveling in a geo-fenced area, within a structure, or otherwise presents a hazard to another individual or living being by analyzing the location of the vehicle 102 and/or sensor data related to the environment surrounding the vehicle 102. The control system 100 activates or sets the vehicle 102 into the EV mode when the vehicle 102 is traveling in the geo-fenced area, within the structure, or otherwise presents the hazard to another individual or living being.

The control system 100 includes an electronic control unit 112 or other processor, a memory 114, a network access device 116 and/or one or more sensors 118. The control system 100 may include a receiver 120, a user interface 122 and/or a navigation unit 124. The control system 100 may include or be coupled to one or more components of the vehicle 102, such as the motor and/or generator 126, the engine 128, the battery 130, and/or the battery management and control unit (BMCU) 132.

A vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The control system 100 includes or couples to one or more processors, such as the electronic control unit (ECU) 112. The one or more processors, such as the ECU 112, may be implemented as a single processor or as multiple processors. For example, the ECU 112 may be a microprocessor, a data processor, a microcontroller or other controller, and may be electrically coupled to some or all the other components within the vehicle 102. The one or more processors may obtain sensor data and/or the current location of the vehicle 102 and determine whether the sensor data is within a normal operating range, e.g. does not exceed one or more thresholds, and/or determine that the vehicle 102 is within the geo-fenced area and/or has entered or exited a structure, such as a building, a mine or other structure. The ECU 112 may be coupled to the memory 114.

The control system 100 has a memory 114. The memory 114 may be coupled to the ECU 112 and store instructions that the ECU 112 executes. The memory 114 may include one or more of a Random Access Memory (RAM), a Read Only Memory (ROM) or other volatile or non-volatile memory. The memory 114 may be a non-transitory memory or a data storage device, such as a hard disk drive, a solid-state disk drive, a hybrid disk drive, or other appropriate data storage, and may further store machine-readable instructions, which may be loaded and executed by the ECU 112. The memory 114 may store user configuration settings that establish one or more thresholds for the sensor data and/or store the location of the geo-fenced area.

The control system 100 includes a network access device 116. The network access device 116 may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The network access device 116 may transmit data to and receive data from the different components of the different entities of the control system 100, such as the user device 104, the vehicle 102, the beacon 106 and/or the external database 108.

The control system 100 may include a user interface 122. The user interface 122 may include an input/output device that receives user input from a user interface element, a button, a dial, a microphone, a keyboard, or a touch screen. The user interface 122 may provide an output to an output device, such as a display, a speaker, an audio and/or visual indicator, or a refreshable braille display. The user input may include one or more configuration settings for the control system 100, such as one or more thresholds and/or the location of the geo-fenced area or entrance to a structure, and/or may provide a notification when the EV mode of the vehicle 102 is activated or set.

The control system 100 includes one or more sensors 118. The one or more sensors 118 may include a photodetector 118a or other light sensor, a proximity sensor 118b, an emission sensor 118c, an airflow sensor 118d, such as an anemometer, an attachment sensor 118e or other sensor. The photodetector 118a or other light sensor may detect or measure an amount of ambient light surrounding the vehicle 102. The photodetector 118a or other light sensor may also detect or measure a change or a rate of change in the amount of ambient light surrounding the vehicle 102.

Similarly, the proximity sensor 118b may detect or measure a relative distance between the vehicle 102 and one or more objects in the surrounding environment of the vehicle 102 and/or may detect or measure a change or a rate of change in the relative distance between the vehicle 102 and the one or more objects in the surrounding environment of the vehicle 102. The one or more sensors 118 may include an emission sensor 118c. The emission sensor 118c may identify the type or kind of emissions in the surrounding environment of the vehicle 102 and/or detect or measure the amount of the type or kind of emissions in the surrounding environment of the vehicle 102. The emission sensor 118c may also detect or measure a change or a rate of change in the amount of the type or kind of emissions in the surrounding environment of the vehicle 102.

The one or more sensors 118 may include an airflow sensor 118d and/or an attachment sensor 118e. The airflow sensor 118d may detect or measure an amount of airflow in the surrounding environment of the vehicle 102. The airflow sensor 118d also detect or measure a change or a rate of change in the amount of airflow in the surrounding environment of the vehicle 102. The amount of airflow may be indicative of the amount of circulation in the surrounding environment. The attachment sensor 118e may detect when another apparatus or device, such as a trailer, is attached to or coupled to the vehicle 102.

The one or more sensors 118 may include other sensors. The other sensors may include LIDAR, radar, infrared, or other signal to detect one or more objects or detect other attributes or characteristics of the surrounding environment.

The one or more sensors 118 may be positioned on the outside frame of the vehicle 102.

The control system 100 may include a receiver 120. The receiver 120 may receive a signal from a beacon 106 that indicates that the vehicle 102 is in proximity to the beacon 106. This allows the control system 100 to determine the location of the vehicle 102 and whether the vehicle 102 is within a structure or other area indicated by the beacon 106, such as a geo-fenced area.

The control system 100 may include or be coupled to one or more vehicle components. The one or more vehicle components may include a navigation unit 124. The navigation unit 124 may be integral to the vehicle 102 or a separate unit coupled to the vehicle 102. The vehicle 102 may include a Global Positioning System (GPS) unit (not shown) for detecting location data including a current location of the vehicle 102 and date/time information instead of the navigation unit 124. The current location of the vehicle 102 and/or the date/time information may be used to indicate when the vehicle 102 is within a geo-fenced area, has passed through an entrance of a structure and/or otherwise determine the location of the vehicle 102 relative to one or more other objects. In some implementations, the ECU 112 may perform the functions of the navigation unit 124 based on data received from the GPS unit. The navigation unit 124 or the ECU 112 may perform navigation functions. Navigation functions may include, for example, route and route set predictions, providing navigation instructions, and receiving user input such as verification of predicted routes and route sets or destinations.

The navigation unit 124 may be used to obtain navigational map information. The navigational map information may include the current location of the vehicle 102 and/or map information that includes the locations of one or more structures, the locations of the one or more geo-fenced areas and/or other information, such as terrain information that indicates the locations, grade or other attributes of the terrain in the areas surrounding the vehicle 102.

The one or more vehicle components may include a motor and/or generator 126. The motor and/or generator 126 may convert electrical energy into mechanical power, such as torque, and may convert mechanical power into electrical energy. The motor and/or generator 126 may be coupled to the battery 130. The motor and/or generator 126 may convert the energy from the battery 130 into mechanical power, and may provide energy back to the battery 130, for example, via regenerative braking. The vehicle 102 may include one or more additional power generation devices such as the engine 128 or a fuel cell stack (not shown). The engine 128 combusts fuel to provide power instead of and/or in addition to the power supplied by the motor and/or generator 126.

The battery 130 may be coupled to the motor and/or generator 126 and may supply electrical energy to and receive electrical energy from the motor and/or generator 126. The battery 130 may include one or more rechargeable batteries and may supply the power to the control system 100.

The BMCU 132 may be coupled to the battery 130 and may control and manage the charging and discharging of the battery 130. The BMCU 132, for example, may measure, using battery sensors, parameters used to determine the state of charge (SOC) of the battery 130. The BMCU 132 may control the battery 130.

Figure 2:
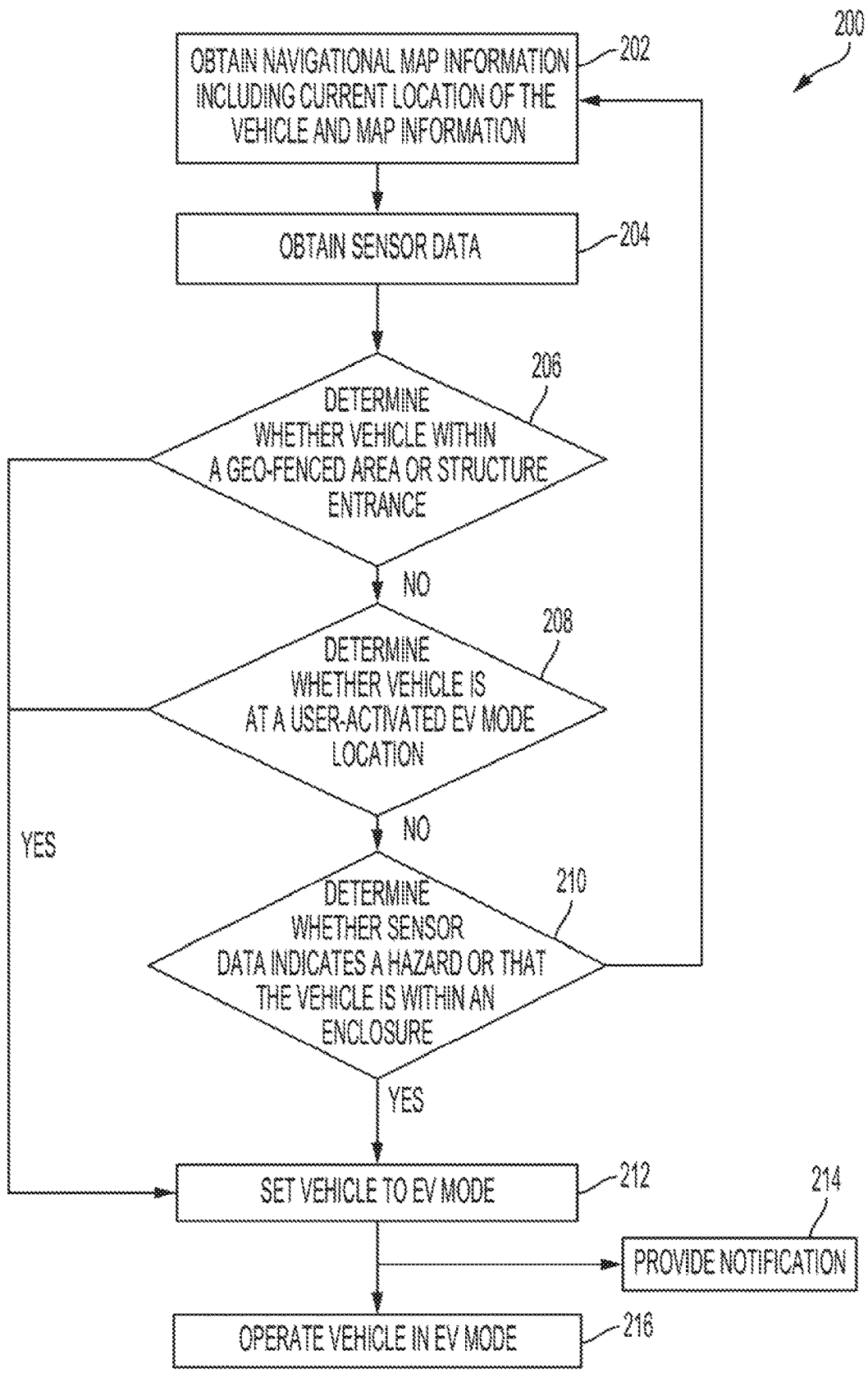
FIG. 2 is a flow diagram of an example process for the automatic activation of the EV mode using the off-road or off-highway vehicle control system of FIG. 1 according to an aspect of the invention.

FIG. 2 is a flow diagram of a process 200 for the automatic activation of the EV mode. One or more computers or one or more data processing apparatuses, for example, the ECU 112 of the control system 100 of FIG. 1, appropriately programmed, may implement the process 200.

The control system 100 obtains the navigational map information (202). The navigational map information may include map information and/or the current location of the vehicle 102. The control system 100 may extract the map information and/or the current location of the vehicle 102 from the navigational map information. The control system 100 may use the navigation unit 124 to obtain the navigational map information. For example, the control system 100 may determine the current location using the navigation unit 124, provide the current location to the external database 108 and obtain the map information of the area surrounding the current location of the vehicle 102. In another example, the navigation unit 124 provides the entirety of the navigational map information including the current location of the vehicle 102 and/or the map information.

Figure 6:
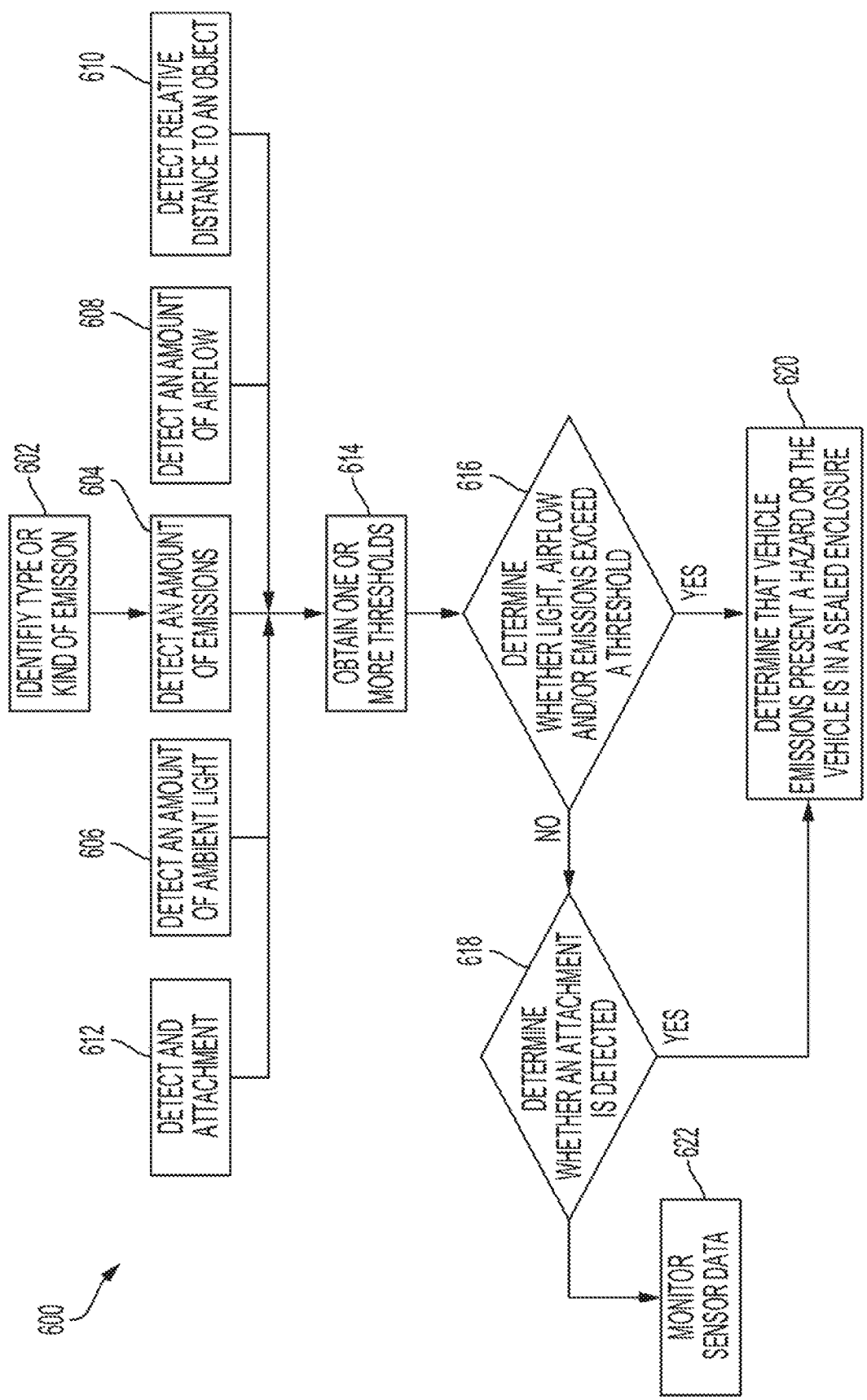
FIG. 6 is a flow diagram of an example process for automatically activating the EV mode in the vehicle based on sensor data using the off-road or off-highway vehicle control system of FIG. 1 according to an aspect of the invention.

The control system 100 obtains sensor data (204). The control system 100 may use one or more sensors 118 to obtain the sensor data. The sensor data may include the amount of ambient light, the amount of emissions, the type, kind or amount of emissions, and/or the amount of airflow. The amounts may be measured over a period of time so that the control system 100 may calculate the change or rate of change of the amounts over the period of time. The sensor data may include an indication that one or more objects are in proximity to the vehicle 102, that the vehicle 102 has entered an enclosure or is within a geo-fenced area, and/or a cargo or trailer has been attached to the vehicle 102. FIG. 6 further describes the process of obtaining the sensor data from the one or more sensors 118.

The control system 100 determines whether the vehicle 102 is within a geo-fenced area or structure entrance (206). The control system 100 may extract the current location of the vehicle 102 and the location of the geo-fenced area or structure entrance from the navigational map information. In some implementations, the geo-fenced area may be user inputted via the user interface 122 and/or the user device 104.

Figure 3:
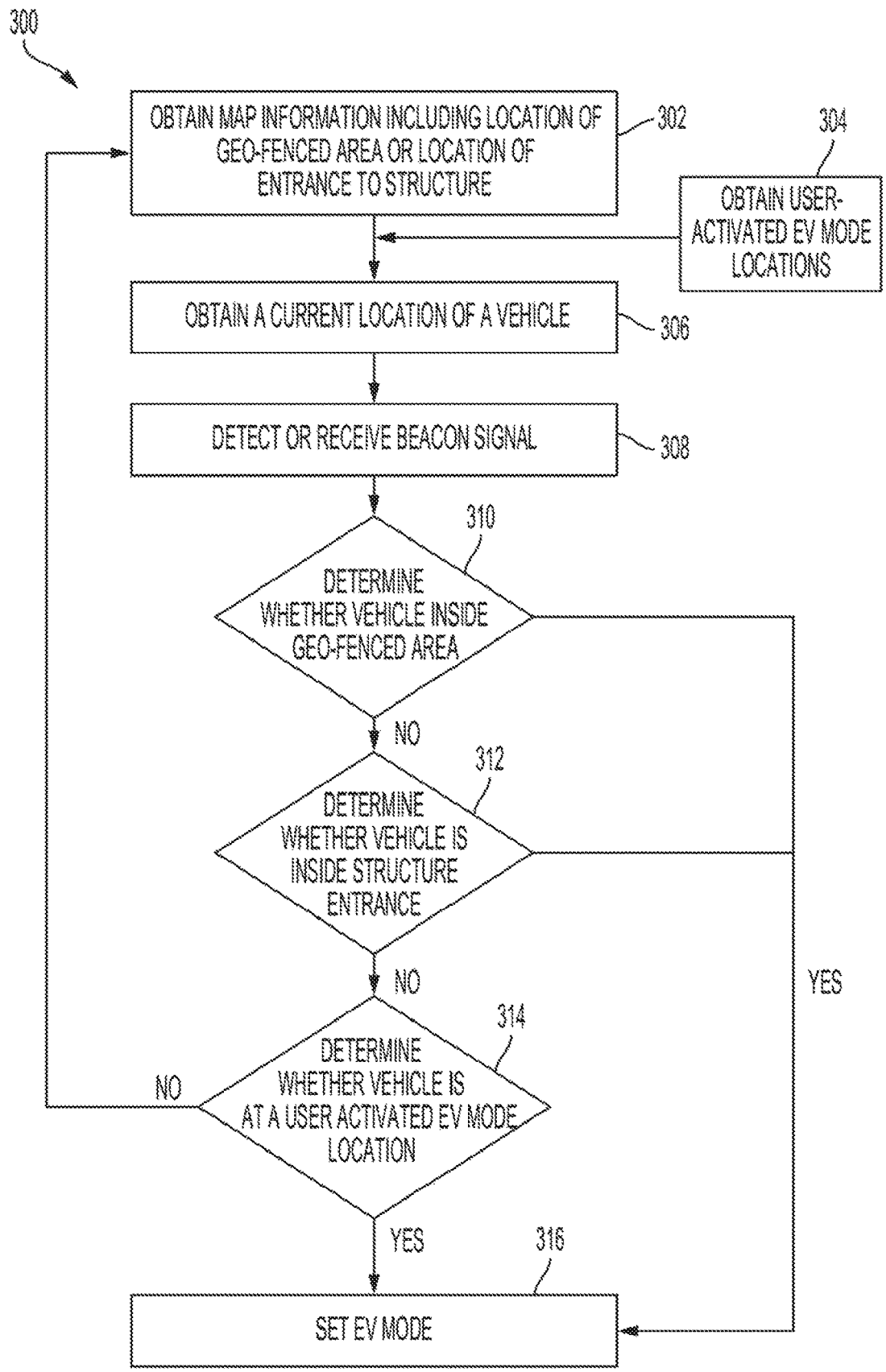
FIG. 3 is a flow diagram of an example process for automatically activating the EV mode in the vehicle 102 based on the location of the vehicle 102 using the off-road or off-highway vehicle control system of FIG. 1 according to an aspect of the invention.

In some implementations, the control system 100 may use the receiver 120 to detect an indication that the vehicle 102 is in proximity to a beacon 106, which may be positioned near or in proximity to an entrance of a structure, such as a mine, barn or other enclosed area or may be positioned around an area to indicate the boundaries of an electronically fenced-in area. FIG. 3 further describes the use of geo-fencing and/or beacons to activate the EV mode.

If the control system 100 determines that the vehicle 102 is within the geo-fenced area or within the structure entrance, the control system 100 may set the vehicle 102 to the EV mode (212). This allows the vehicle 102 to automatically enter the EV mode when the vehicle 102 is within the geo-fenced area where use of the EV mode is desired. The control system 100 may set the vehicle 102 to the EV mode when the vehicle 102 enters a structure, such as by passing through the structure entrance, and so, the vehicle 102 may automatically enter the EV mode when the vehicle 102 is enclosed or surrounded within a structure, such as a mine, barn or garage. By automatically entering the EV mode when the vehicle 102 enters the structure, the vehicle 102 limits or reduces the amount of vehicle emissions emitted by the vehicle 102 in the enclosed and/or confined structure so that the vehicle emissions do not present a hazard.

If the control system 100 determines that the vehicle 102 is not within the geo-fenced area or not within the structure entrance, the control system 100 may determine whether the vehicle 102 is at or in proximity to a user-activated EV mode location (208). One or more user-activated EV mode locations may have been previously stored when the vehicle 102 was previously driven. For example, on a previously driven trip or route, the control system 100 may record and learn the locations of when the driver selects to operate the vehicle 102 in the EV mode. The control system 100 may store each of these locations as a user-activated EV mode location, and when the control system 100 determines that the vehicle 102 approaches, is near or at the user-activated EV mode location, on a subsequent trip or route, the control system 100 may set the vehicle 102 to the EV mode (212). The control system 100 may store the location as a user-activated EV mode location after the user has activated the EV mode at the location a number of times greater than a threshold amount, such as approximately 5 or more times during a time period.

When the control system 100 determines that the vehicle 102 is not approaching, near or at the user-activated EV mode location, the control system 100 may determine whether the sensor data indicates that vehicles emissions would present a hazard or that the vehicle 102 is within an enclosure (210). FIG. 6 further describes the use of the sensor data to determine if there is a hazard or that the vehicle is within a sealed enclosure. When the control system 100 determines that there is no hazard and that the vehicle 102 is not within a sealed enclosure, the control system 100 may continue to monitor the sensor data and the current location of the vehicle 102 (202).

When the control system 100 determines that there is a hazard or the vehicle 102 is within the enclosure, the control system sets the vehicle to the EV mode or other zero-emission mode. The control system 100 sets the vehicle into the EV mode (212). The vehicle 102 may self-check several conditions including the coolant temperature, that the battery 130 is sufficiently charged, and/or the acceleration speed and pedal positioning prior to operating the vehicle 102 in the EV mode. By setting the vehicle 102 into the EV mode, the vehicle 102 may only pull power from its battery 130. This results in the potential for increased fuel efficiency and decreased emissions.

The control system 100 may provide a notification to a user on the user interface 122 (214). The notification may indicate to the user that the vehicle 102 is operating or is about to operate the vehicle 102 in the EV mode. Once set in the EV mode, the control system 100 operates the vehicle 102 in the EV mode (216). The vehicle 102 draws power from its battery 130 to move the wheels of the vehicle 102 and/or to otherwise operate the vehicle 102.

FIG. 3 is a flow diagram of a process 300 for automatically activating the EV mode in the vehicle 102 based on the location of the vehicle 102. One or more computers or one or more data processing apparatuses, for example, the ECU 112 of the control system 100 of FIG. 1, appropriately programmed, may implement the process 300.

Figure 4:
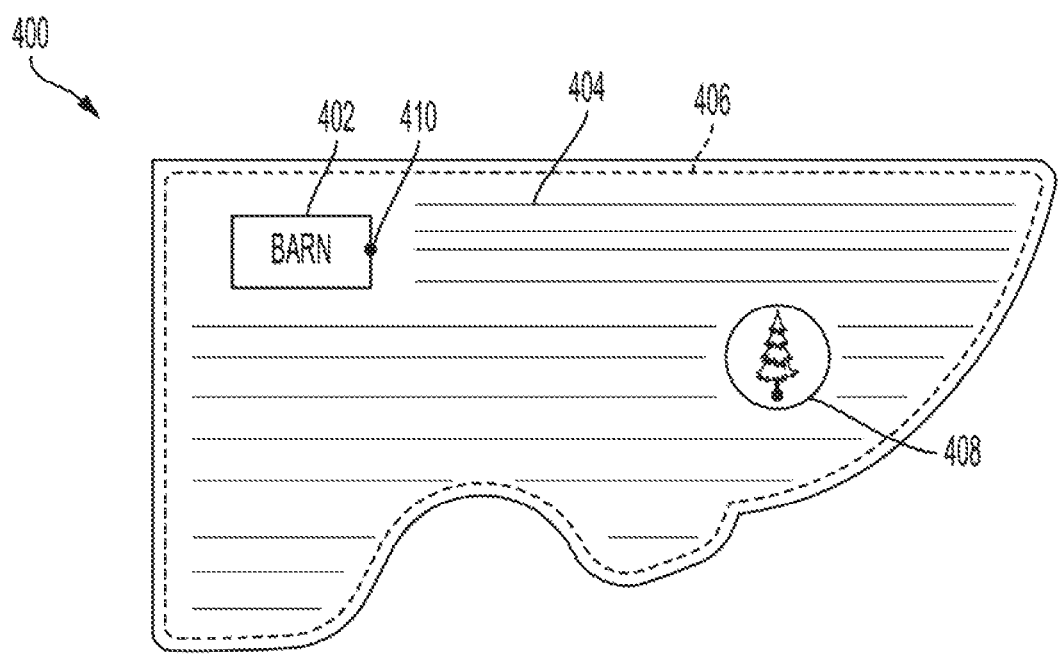
FIG. 4 shows an example geo-fenced area that is monitored using the off-road or off-highway vehicle control system of FIG. 1 according to an aspect of the invention.

The control system 100 may obtain map information that includes the location of a geo-fenced area or the location of an entrance of a structure, such as a building, mine, barn or other structure (302). The control system 100 may cause the user device 104 or the user interface 122 to render a graphical representation of the area 400 of the surrounding environment, as shown in FIG. 4, for example, and receive user input that indicates the location of the geo-fenced area 406 and/or the location of the entrance of the structure 402.

The graphical representation of the area 400 may correspond to the off-mad property or area where the vehicle 102 intends to travel. The control system 100 may cause the graphical representation to display the area 400 including the locations of one or more structures 402, terrain features and/or objects, such as a tree 408, and the anticipated path 404 of the vehicle 102 within the area 400 onto the display of the user device 104 or user interface 122. The user device 104 or the user interface 122 may receive user input that indicates the geo-fenced area 406. The geo-fenced area 406 may be associated with map coordinates, such as a longitude or latitude, that maps or corresponds to the off-road property or area where the vehicle 102 intends to travel. The geo-fenced area 406 may include multiple points or locations that outline a boundary or perimeter that surrounds an area within where the vehicle 102 is to operate in the EV mode. The user input may indicate the locations of one or more beacons 106, such as the beacon 410, which may indicate to the control system 100 to activate the EV mode upon entrance of the structure 402.

The control system 100 may obtain one or more user-activated EV mode locations (304). The control system 100 may obtain the one or more user-activated EV mode locations from the memory 114. The one or more user-activated EV mode locations may have been stored during one or more previous trips of the vehicle 102. The control system 100 may record the number of times a user activates the EV mode via the user interface 122 at a location, and when the number of times the user activates the EV mode at the location exceeds a threshold frequency, such as more than 25% of the time that the user travels in proximity to the location, or exceeds a threshold amount, such as approximately 5 or more times, the control system 100 may store the location as a user-activated EV location. The control system 100 learns that the user tends to activate the EV mode at the one or more user-activated EV locations, and so, may use the user-activated EV locations to automatically activate the EV mode at those locations on subsequent trips.

The control system 100 may obtain a current location of the vehicle 102, as described above (306). The control system 100 may use the navigation unit 124 to obtain the navigational map information and extract the current location of the vehicle 102 from the navigational map information.

The control system 100 may detect or receive a beacon signal (308). The control system 100 may detect or receive the beacon signal from the one or more beacons 106. The one or more beacons 106 may be positioned at an entrance of a structure or around an area to form a geo-fenced area. The one or more beacons 106 may emit a beacon signal in proximity to the one or more beacons 106. The control system 100 may detect or receive the beacon signal, e.g., via the receiver 120, when the vehicle 102 is within a threshold distance of the one or more beacons 106. The beacon signal may be used to activate the EV mode within the vehicle 102, such as at an entrance of the vehicle 102, and/or may be used to keep the EV mode activated within the vehicle 102, such as within the geo-fenced area.

Figure 5A:
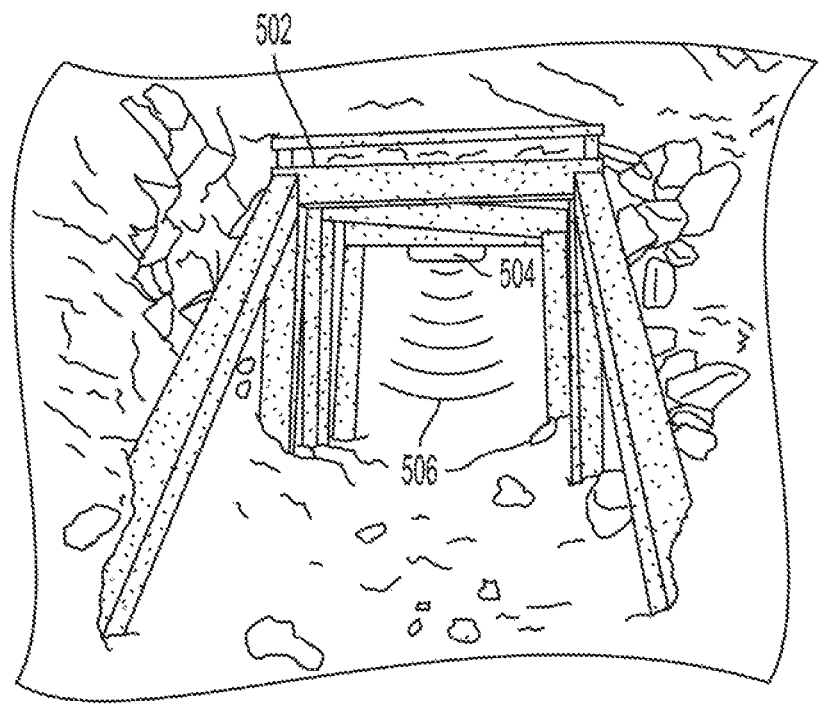
FIG. 5A shows an example entrance to a mine that uses the off-road or off-highway vehicle control system of FIG. 1 to activate the EV mode within a vehicle that enters according to an aspect of the invention.
Figure 5B:
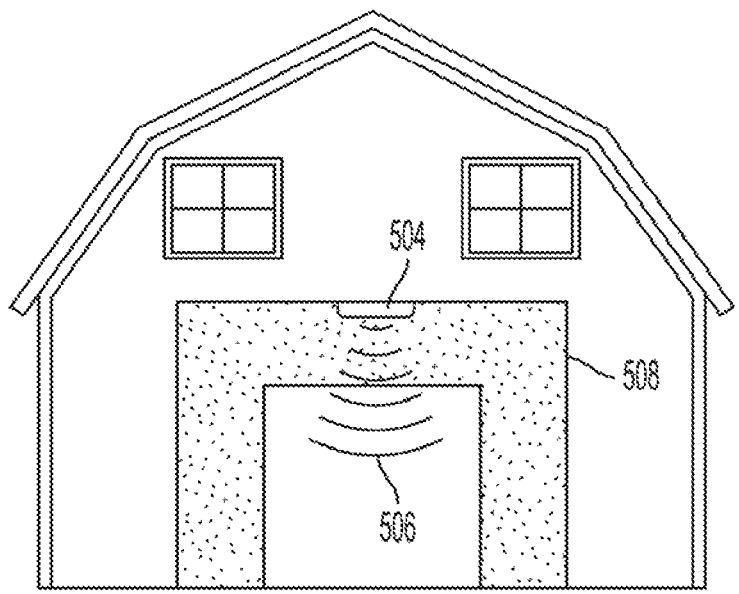
FIG. 5B shows an example entrance to a barn that uses the off-road or off-highway vehicle control system of FIG. 1 to activate the EV mode within a vehicle that enters according to an aspect of the invention.

For example, a beacon 504 may be positioned at an entrance of the mine 502, as shown in FIG. 5A for example. The beacon 504 may emit a beacon signal 506 that when received by the receiver 120 may activate the EV mode of the vehicle 102. In another example, the beacon 504 may be positioned at an entrance of the barn 508, as shown in FIG. 5B for example. The beacon 504 may emit the beacon signal 506 that when received by the receiver 120 may activate the EV mode of the vehicle 102.

The control system 100 determines whether the vehicle 102 is inside the geo-fenced area (310). The control system 100 may compare the current location of the vehicle 102 with the location of the geo-fenced area, which may be defined by multiple locations or coordinates that form the boundary, perimeter or outline of the geo-fenced area 406.

The control system 100 determines whether the current location of the vehicle 102 is within the location of the geo-fenced area 406 based on the comparison. For example, the control system 100 may compare the current location to the locations or coordinates that form the boundary or perimeter of the geo-fenced area 406, and when the current location is within the boundary or perimeter of the geo-fenced area 406, the control system 100 may determine that the current location of the vehicle 102 is within the geo-fenced area. When the control system 100 determines that the current location of the vehicle 102 is within the location of the geo-fenced area, the control system 100 activates or sets the vehicle 102 into the EV mode (316). Otherwise, the control system 100 may determine that the current location of the vehicle 102 is outside and not within the geo-fenced area and check for other factors that may cause the activation of the EV mode.

The control system 100 determines whether the current location of the vehicle 102 is inside or within the entrance of the structure 402 (312). The control system 100 may determine whether the current location of the vehicle 102 is inside or within the entrance of the structure 402 based on the reception or detection of the beacon signal and/or based on a comparison of the current location with the location of the structure 402.

The control system 100 may determine that the current location of the vehicle 102 is inside or within the entrance of the structure when the control system 100 has received or detect the beacon signal. The beacon signal may indicate the location of the entrance of the structure 402, such as the mine 502 and/or the barn 508, as shown in FIGS. 5A and 5B for example. For example, the control system 100 may receive the beacon signal 506 when the vehicle 102 passes near or in proximity to the beacon 504. The beacon 504 may be positioned near the entrance of the mine 502, as shown in FIG. 5A for example, or the entrance of the barn 508, as shown in FIG. 5B for example. And so, when the control system 100 receives the beacon signal 506, this may indicate that the vehicle 102 has entered the mine 502 and/or the barn 508.

In some implementations, the control system 100 may compare the current location of the vehicle 102 with the location of the structure. And when the current location of the vehicle 102 is within a threshold distance of the location of the structure, such as within approximately a foot, the control system 100 may determine that the vehicle 102 is within the structure. When the control system 100 determines that the vehicle 102 is within or inside the entrance of the structure, the control system 100 may set or activate the vehicle 102 into the EV mode (316). Otherwise, the control system 100 may determine that the current location of the vehicle 102 is outside and not inside or within the entrance of the structure and check for other factors that may cause the activation of the EV mode.

The control system 100 determines whether the current location of the vehicle 102 is at or in proximity to a user-activated EV mode location (314). The control system 100 may compare the current location of the vehicle 102 to the one or more user-activated EV mode locations, which represent the locations of where the user previously activated the EV mode during a previous trip. If the current location is within a threshold distance, such as approximately within a few feet, of the user-activated EV mode location, the control system 100 may determine that the current location of the vehicle 102 is at or in proximity to the user-activated EV mode location and activate or set the vehicle 102 into the EV mode (316). Otherwise, the control system 100 may determine that the current location of the vehicle 102 is not near or in proximity to a user-activated EV mode location and continue to monitor for other the location of the vehicle 102 (302).

FIG. 6 is a flow diagram of a process 600 for automatically activating the EV mode in the vehicle 102 based on sensor data to detect a hazardous situation or an enclosed environment. One or more computers or one or more data processing apparatuses, for example, the ECU 112 of the control system 100 of FIG. 1, appropriately programmed, may implement the process 600. The control system 100 may use various types or kinds of sensor data to determine whether to activate the EV mode in the vehicle 102. The control system 100 may measure the sensor data and determine whether the measurement indicates that the vehicle emissions present a hazard and/or the vehicle 102 is within an enclosed area.

The control system 100 may identify, detect or determine the type or kind of emissions that are in the surrounding environment of the vehicle 102 (602). The control system 100 may use the emission sensor 118c to detect or determine the type or kind of particulates of emissions that are in the air surrounding the vehicle 102. For example, the emission sensor 118c may identify whether there are any combustible or flammable particulates in the air surround the vehicle 102, such as any nitrogen-based fertilizers, mining compounds, methane, ammonia or other combustible, hazardous or flammable particulates or emissions.

Once the type or kind of emission is identified, the control system 100 may detect or determine an amount or concentration of each type or kind of emission that is detected and/or identified (604). The control system 100 may use the emission sensor 118c to measure the amount or the concentration of each type or kind of emission in the air surrounding the vehicle 102. For example, the emission sensor 118c may determine the amount or concentration of each of the nitrogen-based fertilizers, the amount or concentration of each of the mining compounds and/or the amount or concentration of each of the combustible or flammable particulates or emissions in the air in the surrounding environment of the vehicle 102.

The control system 100 may detect, determine or measure an amount of ambient light in the surrounding environment (606). The control system 100 may use a photodetector 118a or other light sensor to detect the amount of ambient light in the surrounding environment. The photodetector 118a or other light sensor may measure the instantaneous amount of light in the surrounding environment and/or measure the amount of light over a period of time. The control system 100 may calculate or determine a rate or an amount of change of the amount of ambient light over the period of time based on the measurements of the instantaneous amount of light over the period of time.

The control system 100 may detect, determine or measure an amount of airflow in the surrounding environment (608). The control system 100 may use an airflow sensor 118d, such as an anemometer, to detect the amount of airflow in the surrounding environment. The airflow sensor 118d may measure the instantaneous amount of airflow in the surrounding environment and/or measure the amount of airflow over a period of time. The control system 100 may calculate or determine a rate or an amount of change of the amount of ambient airflow over the period of time based on the measurements of the instantaneous amount of ambient airflow over the period of time.

The control system 100 may determine or measure a relative distance to a surrounding object (610). The control system 100 may use a proximity sensor 118b to measure the relative distance to one or more objects in the surrounding environment. This allows the control system 100 to identify a person, animal or other living being within the vicinity of the vehicle 102 where vehicle emissions may present a hazard to the person, animal or other living being.

The control system 100 may detect an attachment that is connected to the vehicle 102 (612). The control system 100 may use an attachment sensor 118e to detect that there is an attachment, such as a trailer or cargo, that is connected or being connected to the vehicle 102. An attachment may be a trailer, a storage container, another vehicle or other object that is connected, coupled or otherwise attached to the vehicle 102 to be towed. When an attachment is connected or being connected to the vehicle 102, a person, an animal or other living being may be behind the vehicle 102, and so, vehicle emissions may present a hazard to the person, the animal or other living being.

The control system 100 determines or obtains one or more thresholds for the various parameters, described above (614). The one or more thresholds may be obtained from the memory 114. The one or more thresholds may be different for each of the various parameters, and each of the one or more thresholds may correspond to one of the parameters. For example, there may be a different threshold for each of the following: the amount of ambient light, the rate or change in the ambient light, the amount of airflow, the rate or change in the airflow, the amount or concentration of each of the various types or kinds of emissions that are identified and detected, and/or the relative distance to an object. The various types or kinds of emissions may also have different thresholds. For example, for a flammable or hazardous emission, such as a nitrogen-based fertilizer and/or a mining compound the mere presence of the fertilizer and/or the mining compound may cause the emission sensor to indicate that the threshold has been exceeded. Whereas, in another example, the emission may be a non-volatile compound, such as dirt particles, and the threshold may be of a much higher amount or concentration.

The one or more thresholds may also be based on other factors, such as the time of day, weather, season of the year or the current location of the vehicle 102. For example, the threshold corresponding to the amount of light may less during the evening and/or morning than during midday because the ambient light outside during the evening and/or morning is less than during midday. In another example, when the current location of the vehicle 102 indicates that the vehicle 102 is outdoors or within a huge structure the threshold corresponding to the amount of emissions may be greater than when the current location of the vehicle 102 indicates that the vehicle 102 is indoors within a smaller structure, such as a household garage.

Once the one or more thresholds have been determined, the control system 100 determines whether the light, airflow, emissions and/or the relative distance between an object and the vehicle 102 exceeds the corresponding threshold associated with the light, airflow, emissions and/or relative distance, respectively (616). The control system 100 may determine whether the amount of light is less than a threshold amount that corresponds to the amount of light surrounding the vehicle, the amount of airflow is less than a threshold amount that corresponds to the amount of airflow surrounding the vehicle, the amount of emissions are greater than a threshold amount and/or the relative distance between the object to the vehicle 102 is less than a threshold distance.

In some implementations, the control system 100 may determine whether the rate or change in the amount of light and/or the amount of airflow indicates that the amount of light and/or the amount of airflow, respectively, has decreased by a threshold amount. The control system 100 may compare the amount of light, airflow, distance or emissions over a period of time to determine whether the factors have increased or decreased.

When the control system 100 determines that the amount of light is less than the threshold amount of value, the amount of airflow is less than the threshold amount or that the amount of an emission is greater than the threshold amount, the control system 100 may determine that the vehicle 102 is within a sealed enclosure, such as a structure, or that the vehicle emissions present a hazard (620). Additionally, when the control system 100 determines that the relative distance to an object, such as person, animal or other living being, the control system 100 may determine that there the vehicle emissions present a hazard (620). Similarly, the control system 100 may determine that the vehicle emissions present a hazard and/or the vehicle 102 is in the sealed enclosure when the rate or change in the amount of light and/or the amount of airflow indicates that the amount of light and/or the amount of airflow has decreased by a threshold amount. The control system 100 may use one of the light, airflow, emissions and/or the relative distance between an object and the vehicle 102 and/or a combination of the light, airflow, emissions and/or the relative distance between the object and the vehicle 102 and their corresponding thresholds to determine whether the vehicle 102 is within the sealed enclosure or that the vehicle emissions present a hazard. Each parameter may be weighted or prioritized differently to determine whether the vehicle 102 is within the sealed enclosure or that the vehicle emissions present a hazard.

Otherwise, the control system 100 may determine whether an attachment is detected (618). The control system 100 may use the attachment sensor 118e to determine whether there is an attachment that is being connected to the vehicle 102, which may indicate that there is a person, animal or other living being behind the vehicle 102 whom may be exposed to any vehicle emissions. When there is an attachment being connected, the control system 100 may determine that the vehicle 102 is within the sealed enclosure and/or the vehicle emissions present a hazard (620). The control system 100 may then activate the EV mode within the vehicle 102. When there is not attachment being connected to the vehicle 102 and the ambient light, emissions, airflow and relative distance do not exceed there corresponding thresholds, the control system 100 may continue monitoring the sensor data to determine whether the vehicle emissions present a hazard and/or the vehicle 102 is within a sealed enclosure (622).

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A control system for an off-road vehicle, comprising:
a navigation device configured to obtain a current location of the off-road vehicle; and
an electronic control unit coupled to the navigation device and configured to:
compare the current location of the off-road vehicle to coordinates of a perimeter of a geo-fenced area, and
set the off-road vehicle into an electrical vehicle (EV) mode when:
(i) the current location of the off-road vehicle is within the perimeter of the geo-fenced area or within a predetermined distance from the geo-fenced area, and
(ii) a percentage of times the EV mode was previously activated
(a) within the perimeter of the geo-fenced area or
(b) within the predetermined distance from the geo-fenced area exceeds a threshold percentage value.

2. The control system of claim 1, wherein the coordinates of the perimeter of the geo-fenced area are map coordinates that include latitude and longitude coordinates and that define or outline a perimeter of an off-road property.

3. The control system of claim 1, wherein the electronic control unit is further configured to:
determine the coordinates of the perimeter of the geo-fenced area based on user input that indicates locations of one or more beacons.

4. The control system of claim 1, further comprising:
a sensor configured to obtain sensor data relating to at least one part of a surrounding environment of the off-road vehicle, wherein the sensor is a photodetector and the sensor data includes an amount of ambient light of the surrounding environment, wherein the electronic control unit is further configured to set the off-road vehicle into the EV mode when the amount of ambient light decreases a threshold amount from a baseline.

5. The control system of claim 1, further comprising:
a sensor configured to obtain sensor data relating to at least one part of a surrounding environment of the off-road vehicle, wherein the sensor is an anemometer or other airflow sensor and the sensor data includes an amount of airflow of the surrounding environment, wherein the electronic control unit is further configured to set the off-road vehicle into the EV mode when the amount of airflow is less than a threshold value or decreases a threshold amount from a baseline.

6. The control system of claim 1, further comprising:
a sensor configured to obtain sensor data relating to at least one part of a surrounding environment of the off-road vehicle, wherein the sensor is an emission sensor and the sensor data includes a concentration of an emission and an identification of the emission in the surrounding environment, wherein the electronic control unit is further configured to set the off-road vehicle into the EV mode when the concentration of the emission is greater than a threshold amount.

7. The control system of claim 1, further comprising:
a sensor configured to obtain sensor data relating to at least one part of a surrounding environment of the off-road vehicle, wherein the sensor is a proximity sensor or an attachment sensor and the sensor data includes an indication that there is a living being surrounding the off-road vehicle or that a trailer or other cargo has been attached to the off-road vehicle, wherein the electronic control unit is further configured to set the off-road vehicle into the EV mode based on the indication.

8. The control system of claim 1, further comprising:
a memory configured to store a plurality of locations where the EV mode was previously activated;
wherein the electronic control unit is further configured to:
obtain user input that indicates that a user has activated the EV mode,
identify a location of the off-road vehicle where the user input indicates that the user has activated the EV mode,
store the location among the plurality of locations, and
set the off-road vehicle into the EV mode further based on the current location and the plurality of locations where the EV mode was previously activated.

9. An off-road control system for an off-road vehicle, comprising:
a sensor configured to detect a parameter of a surrounding environment of the off-road vehicle; and
an electronic control unit coupled to the sensor and configured to:
determine whether a current location of the off-road vehicle is within map coordinates that include latitude and longitude coordinates and that define a perimeter of an off-road property,
set the off-road vehicle into an electrical vehicle (EV) mode based on:
(i) the detected parameter, and
(ii) a percentage of times the EV mode was previously activated
(a) within the perimeter of the off-road property or
(b) within a predetermined distance from the off-road property
exceeding a threshold percentage value, and
operate the off-road vehicle in the EV mode.

10. The off-road control system of claim 9, wherein the parameter is an indication of an entrance of a structure, wherein the electronic control unit is further configured to:
obtain the indication from a transmitter; and
set the off-road vehicle into the EV mode in response to detecting or obtaining the indication from the transmitter.

11. The off-road control system of claim 9, wherein the parameter is an amount of ambient light of the surrounding environment, wherein the electronic control unit is further configured to:
obtain the amount of ambient light of the surrounding environment; and
set the off-road vehicle into the EV mode when the amount of ambient light is less than a threshold value or decreases a threshold amount from a baseline.

12. The off-road control system of claim 9, wherein the parameter is an amount of ambient airflow of the surrounding environment, wherein the electronic control unit is further configured to:
obtain the amount of ambient airflow of the surrounding environment; and
set the off-road vehicle into the EV mode when the amount of ambient airflow is less than a threshold value or decreases a threshold amount from a baseline.

13. The off-road control system of claim 9, wherein the parameter is a concentration of an emission and an identification of the emission in the surrounding environment, wherein the electronic control unit is further configured to:

obtain the concentration of the emission and the identification of the emission in the surrounding environment; and set the off-road vehicle into the EV mode when the concentration of the emission is greater than a threshold amount, wherein the threshold amount is based on the identification of the emission and is different for different types of emissions.

14. The off-road control system of claim 9, wherein the parameter is a relative distance of an object from the off-road vehicle, wherein the electronic control unit is further configured to:

set the off-road vehicle into the EV mode when the relative distance is less than a threshold distance that indicates that the object is in proximity to the off-road vehicle.

15. The off-road control system of claim 9, wherein the parameter is an indication that an object is being attached to the off-road vehicle, wherein the electronic control unit is further configured to:

obtain the indication that the object is being attached; and
set the off-road vehicle into the EV mode when the indication is obtained.

16. A method for controlling operation of an off-road vehicle, comprising:

obtaining, by an electronic control unit and using a navigation device, a current location of the off-road vehicle;

obtaining, by the electronic control unit and using a sensor, sensor data of a surrounding environment of the off-road vehicle;

determining, by the electronic control unit, coordinates of a perimeter of an off-road property based on user input that indicates one or more locations of one or more beacons;

setting, by the electronic control unit, the off-road vehicle into an electrical vehicle (EV) mode when:
 (i) the current location of the off-road vehicle is within the coordinates of the perimeter of the off-road property or within a predetermined distance from the off-road property, and
 (ii) a percentage of times the EV mode was previously activated
  (a) within the perimeter of the off-road property or
  (b) within the predetermined distance from the off-road property
 exceeds a threshold percentage value; and
operating, by the electronic control unit, the off-road vehicle in the EV mode.

17. The method of claim 16, wherein obtaining the sensor data includes obtaining an amount of ambient light of the surrounding environment and an amount of ambient airflow of the surrounding environment.

18. The method of claim 17, further comprising:
determining that the amount of ambient light is less than a first threshold value; and
determining that the amount of ambient airflow is less than a second threshold value;
wherein setting the off-road vehicle into the EV mode includes setting the off-road vehicle into the EV mode when the amount of ambient light is less than the first threshold value and the amount of ambient airflow is less than the second threshold value.

19. The method of claim 17, further comprising:
obtaining a history of locations that indicate when the EV mode was previously activated; and
setting the off-road vehicle into the EV mode when the current location is within a threshold distance of one of the locations in the history of locations that indicate when the EV mode was previously activated.

* * * * *